United States Patent Office 3,420,192
Patented Jan. 7, 1969

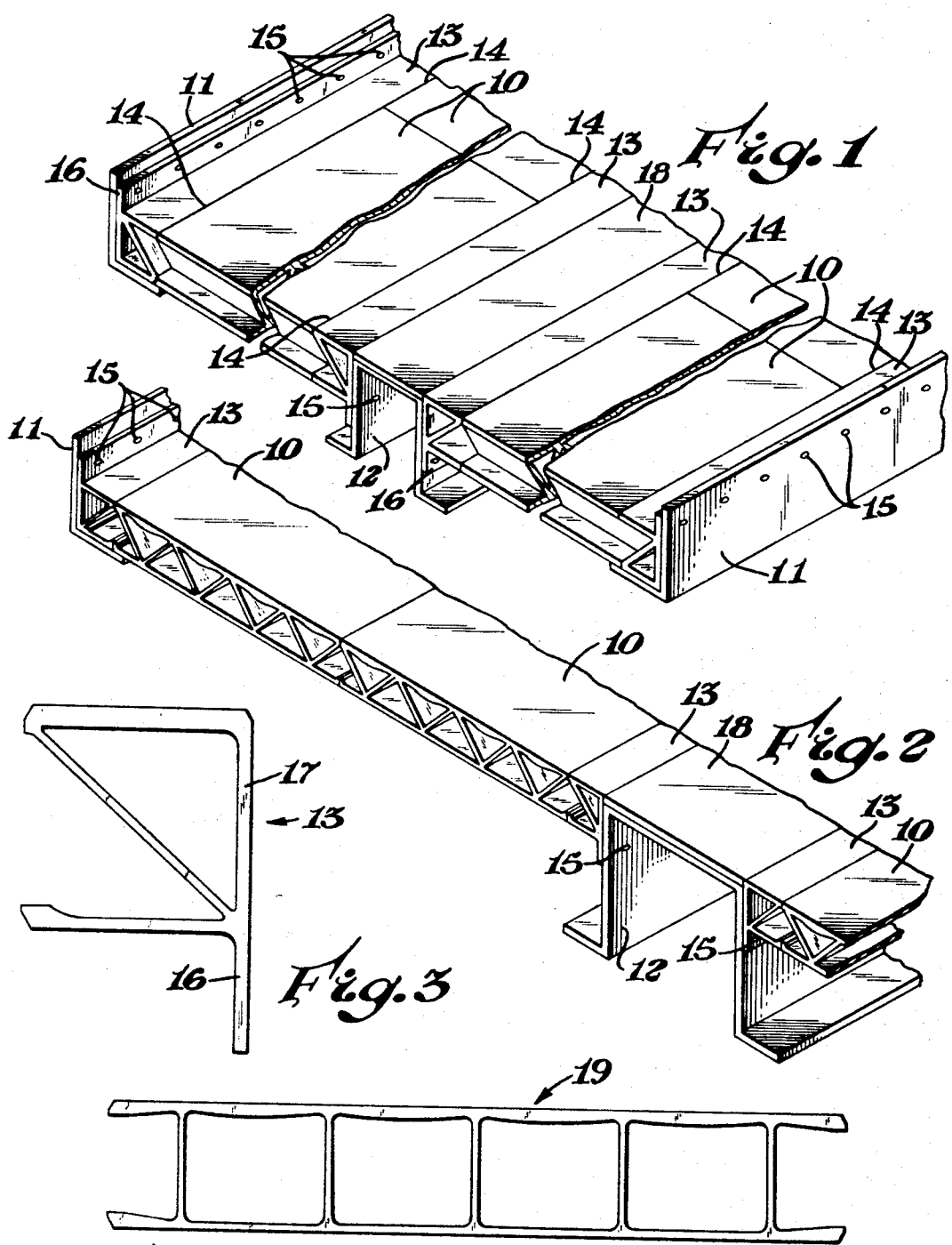

1

3,420,192
UNITIZED FLOORING FOR
WHEELED VEHICLES
John T. Ellis, Midland, Mich., assignor to The Dow
Chemical Company, Midland, Mich., a corporation
of Delaware
Filed June 3, 1966, Ser. No. 555,163
U.S. Cl. 105—422     9 Claims
Int. Cl. B61d 17/10

ABSTRACT OF THE DISCLOSURE

A unitized flooring assembly for a wheeled vehicle has longitudinally extending side sills and a center sill supported on the axle by mounting means and first and second complementary arrays of extruded multi-cavity hollow-core aluminum alloy panels lying in abutting side by side relationship, the panels in each array being welded together in each array being rigidly attached to adapter sections at each edge and each adapter section being rigidity attached to, as the case may be, the adjacent side sill or center sill so that the sills, the adapters and the arrays of panels are all connected together so as to provide a substantially continuous and connecting flat upper surface that lies substantially in one plane. The center sill is protected by either a metal plate or a multi-cavity hollow-core panel of lesser face to face dimension than the panels. The panels, in effect, are nested between the sills and there is no other underlying construction so that the center of gravity of the vehicle is kept very low, and a large volume payload can be accommodated. In addition, the floor structure is lightweight and strong so that a heavier payload may be carried in the vehicle.

Figure 5:
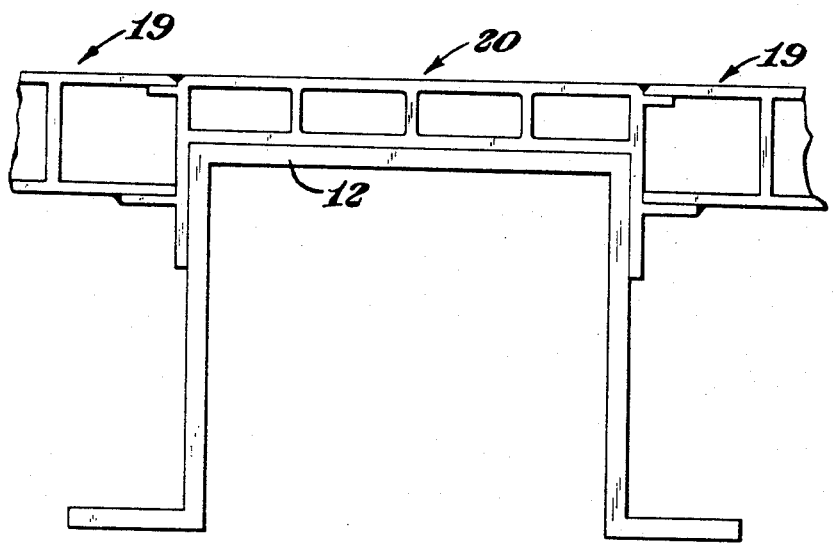

The invention relates to a unitized flooring assembly for wheeled vehicles such as boxcars, freight trucks and tractor trailers. It more particularly relates to a unitized floor assembly made up primarily of extruded hollow-core multi-cavity panels formed of aluminum-base alloy containing at least 70 percent by weight of aluminum. Such alloy is hereinafter referred to as aluminum alloy.

It is a principal object of the invention to provide a load carrying floor unit or assembly as a completely separate structure, for simplicity and low construction cost, that can be set down on the underframe of a large wheeled vehicle and bolted or riveted to the underframe without further additions to the structure.

Another object of the invention is to provide a flooring assembly for a wheeled vehicle which permits the carrying of bigger payloads therein.

A further object of the invention is to provide a flooring assembly for wheeled vehicles which permits carrying a larger volume load in the vehicles.

Another object of the invention is to provide a lightweight flooring assembly for wheeled vehicles.

Yet a further object of the invention is to provide for a flooring assembly for wheeled vehicles which does not require the use of transverse frame members to support the floor.

These and other objects and advantages of the present invention will be apparent to those skilled in the art on becoming familiar with the following description and the appended drawings in which like reference numerals refer to like parts, and in which

2

Figure 6:
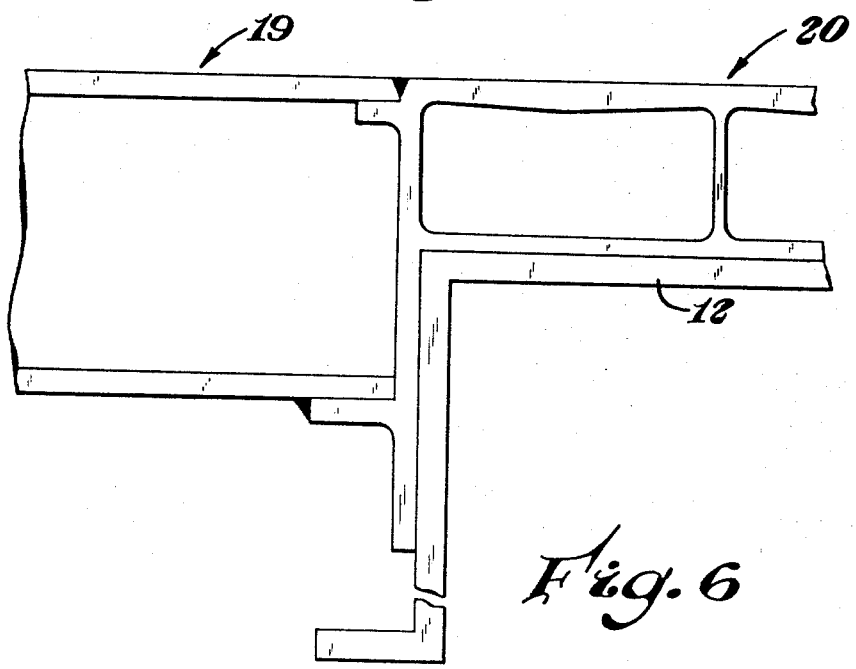

FIG. 1 is a fragmentary, transversely foreshortened, perspective view of the present unitized flooring assembly mounted on side sills and a center sill and made up of transversely disposed hollow-core floor panels; and FIG. 2 is a fragmentary perspective view of the present unitized flooring assembly similar to the assembly in FIG. 1 but having longitudinally extending hollow-core floor panels and showing the multi-cavity truss core construction; and FIG. 3 is an end view of a suitable adapter section member used to connect floor panels to side sills and/or center sills; and FIG. 4 is an end view of a suitable extruded multi-cavity hollow-core floor panel having stringers as integral webbing portions; and FIG. 5 is a fragmentary end view of an assembly similar to the assemblies shown in FIGS. 1 and 2, but having a multi-cavity hollow-core extruded panel over the center sill instead of a single plate; and FIG. 6 is an enlarged fragmentary view of a portion of FIG. 5 showing the joint detail around the center sill of the assembly of FIG. 5.

The invention comprises a unique combination of extruded multi-cavity hollow-core aluminum alloy panels welded together in first and second complementary arrays each comprising such panels lying in contiguous side-by-side abutting relationship, each array extending substantially from a side sill to the center sill and substantially from end to end of the wheeled vehicle, each array being bounded at the edge adjacent a side sill by an adapter section integrally connected to the adjacent side sill and the array, each array being integrally attached to its complementary array by connecting plate means mounted on and substantially longitudinally and transversely coextensive with the center sill, and the adapter sections, the arrays, and the connector plate means each presenting substantially continuous and connecting flat upper surfaces which lie substantially in the same plane and substantially constitute the load carrying floor of the wheeled vehicle.

Referring now to FIG. 1, the floor assembly is seen to comprise hollow-core panels 10 of a multi-cavity core construction better illustrated in FIG. 2. The panels 10 shown in FIG. 1 extend transversely across between the side sills 11 and the center sill 12. The ends 14 of the panels 10 are welded to extruded hollow-core adapter sections 13 which present a flat upper load bearing surface flush with the upper surface of the panels 10. The adapter sections 13 are fastened, respectively, to a side sill 11, or the center sill 12, as by rivets 15.

The adapter sections 13 may have most any form desired, but should provide a strong load bearing surface, support for the regular hollow-core panels, and means for fastening, readily, the adapter section to the adjacent sill. Here riveted attachment is faciliated by a flange or leg portion 16. Flange portion 16, as seen in FIG. 3, may be simply an extension of the wall 17 constituting the closed side of the adapter section 13. The particular configuration chosen for the adapter section 13 shown in FIG. 3 is of advantage because left and right hand forms are not needed. The same shape of section may be used with the flange portion up adjacent the side sills, and down adjacent the center sill.

Superposed on the center sill 12 is a connecting plate 18 which rests on the center sill 12. Connecting plate 18 is welded along its two side edges to the two adjacent sections 13. The connecting plate 18, each of the adapter sections 13, and each of the panels 10 present substantially flush or coplanar surfaces which collectively constitute substantially the load bearing floor of the wheeled vehicle. Where the connecting plate 18 is a single plate of metal, a floor is obtained which is positioned lower with respect to the supporting sills than would be possible if intermediate transverse frame members were placed across the sills and used as the immediate support for the floor. Such lower position of the floor lowers the center of gravity of the wheeled vehicle, permits larger volume loads, and, because the weight of intermediate frame members is avoided, and because the center of gravity is lowered, bigger or heavier payloads can be transported by the vehicle.

The side sills 11 and the center sill 12 are supported by support means (not shown) mounted on the axels (not shown) of the wheeled vehicle in any appropriate manner as well understood in the art, the sills normally extending longitudinally of the vehicle and normal to the axles.

The floor is made up, as shown in FIG. 1, of two arrays of hollow-core panels welded in side-by-side abutting relationship, and joined at the ends of the panels to the adapter sections 13 as described hereinabove. The sills do not form a part of the unitized floor assembly. The unitized assembly comprises in sequence from sid-to-side: an adapter section, an extruded hollow-core panel, another adapter section, a connecting plate, an adapter section, an extruded hollow-core panel, and still another adapter section. In such a floor assembly, any load thereon is carried directly by the side and center sills.

The side sills and the center sill are formed of suitably high strength metal, such as steel or aluminum alloy. If desired, the adapter sections used at the sides of the floor assembly may be made of heavier gauge aluminum alloy and suitably shaped to serve both the functions of the adapter section and side sill. In such event the adapter section shown in FIG. 3 need not be modified beyond making the flange or leg portion 16 long enough to connect with vertical side wall frame members (not shown), and the side sill is then omitted as a separate structural member and becomes a part of the floor assembly.

In FIG. 2 there is shown a fragmentary view of another embodiment of the present assembly. In this embodiment, the extruded hollow-core panels 10 extend longitudinally of the wheeled vehicle, i.e., substantially parallel to the sills 11, 12. Where long enough extruded panels are available, each panel extends the length of the floor assembly. Where long panels are not available, a plurality of panels laid end to end are used to extend the floor from end to end of the assembly. Sufficient panels are used to make up the desired width of array between each side sill and the center sill.

According to load carrying and bending characteristics desired, other forms of extruded multi-cavity hollow-core panels may be employed besides the truss cored panels of FIGS. 1 and 2. Another form of suitable panel employing integral stringers, i.e., webbing disposed substantially normal to the spaced apart planar surfaces, is shown in FIG. 4. Such a panel may be substituted for the panels 10 of the assemblies of FIGS. 1 and 2.

The side walls of the vehicle are attached to the side sills and to appropriate plates or angles attached to the ends of the floor assemblies as well understood in the art.

Suitable aluminum alloys from which the structural parts of the present assembly may be extruded or rolled and fabricated include alloys having the Aluminum Association designations 3003, 5056, 6061, 7075 and X7005.

In yet another embodiment of the floor assembly of the invention, as shown in FIG. 5, a different form of connector plate 20 is used which takes the form of an extruded multi-cavity hollow-core panel with narrower face to face dimensions than the panels 19, of the panels 10 of FIGS. 1 and 2. The panel 20 has a greater thickness than the single thickness plate 18 of FIGS. 1 and 2 and provides for greater clearance between the bottom of the assembly and the axles and wheels of the vehicle. This may be an important consideration in carrying high density loads on sprung vehicles.

The particular center panel 20 shown in FIG. 5 also has the advantage that a single extrusion performs the functions of both adapter sections normally associated with the center sill 12, as well as the function of the connecting plate. Such construction eliminates several welds and avoids failure of the adapter section to be supported by the center sill in case of weld failure. The center panel 20 rests securely over the center sill 12 and provides positive support for the floor assembly.

The detail of the assembly of the center panel 20 and center sill 12 with flooring panels 19 and appropriate weld junctures is illustrated in the fragmentary end view in FIG. 6.

For the sake of simplicity of the drawing, weld beads between panels 10 and adapter sections 13, and between adapter sections 13 and connecting plates 18, respectively, have not been shown in FIGS. 1 and 2, but are to be understood to be similar to the welds between panel 19 and connecting plate 20 shown in FIGS. 5 and 6.

I claim:
1. A unitized flooring assembly for a wheeled vehicle having a center sill and a side sill disposed on either side of the center sill, said center sill and the side sills being each substantially parallel to and spaced apart from the other said sills, and each sill being supported by supporting means mounted on the axles of the wheeled vehicle, which comprises:

first and second complementary arrays of extruded multicavity hollow-core aluminum alloy panels lying in contiguous side-by-side abutting relationship and welded together, each array substantially extending from a side sill to the center sill and substantially from end to end of the wheeled vehicle, each array being bounded at the edge adjacent a side sill by an adapter section integrally connected to the adjacent side sill and the array and disposed between the side sill and the array, each array being integrally attached to its complementary array by connecting plate means, said connecting plate means being mounted on and substantially longitudinally and transversely coextensive with the center sill, and adapter sections, said arrays, and said connecting plate means each presenting substantially continuous and connecting flat upper surfaces which lie substantially in the same plane and substantially constitute the load carrying floor of the wheeled vehicle.

2. The flooring assembly as in claim 1 in which the extruded hollow-core panels are of truss core construction.

3. The flooring assembly as in claim 1 in which the extruded hollow-core panels consist substantially of spaced apart planar surfaces joined by stringer-type webbing portions.

4. The flooring assembly as in claim 1 in which the extruded hollow-core panels are assembled with the direction of extrusion of the panels substantially normal to the center sill.

5. The flooring assembly as in claim 1 in which the extruded hollow-core panels are assembled with the direction of extrusion of the panels substantially parallel to the center sill.

6. The flooring assembly as in claim 1 which is substantially supported directly by said side sills and center sill.

7. The flooring assembly as in claim 1 in which the connecting plate means is an extruded multi-cavity hollow-core aluminum alloy panel.

8. The flooring assembly as in claim 1 in which the side sills are each an integral part of that edge of each array which is remote from the center sill.

9. The flooring assembly as in claim 1 in which the connecting plate means is welded to each array, and the adapter sections are welded to that edge of each array remote from the center sill.

References Cited

UNITED STATES PATENTS

| | | | |
|---|---|---|---|
| 2,669,193 | 2/1954 | Osborn | 105—422 |
| 2,753,018 | 7/1956 | Curell | 105—422 |
| 2,786,556 | 3/1957 | Constance | 105—422 |
| 2,952,341 | 9/1960 | Weiler | 105—422 |
| 3,132,605 | 5/1964 | Collins | 105—422 |
| 3,195,477 | 7/1965 | Jones et al. | 105—422 |

ARTHUR A. LA POINT, *Primary Examiner.*

R. A. BERTSCH, *Assistant Examiner.*